United States Patent
Klesk et al.

(10) Patent No.: US 11,874,642 B2
(45) Date of Patent: Jan. 16, 2024

(54) METHODS TO CONFIGURE A SAFETY CONTROL SYSTEM

(71) Applicant: Banner Engineering Corp., Minneapolis, MN (US)

(72) Inventors: John Klesk, Minneapolis, MN (US); Danielle Liu, Minneapolis, MN (US); Greg Sorvari, Minneapolis, MN (US); Dean Erickson, Minneapolis, MN (US); Jeff Dixon, Minneapolis, MN (US)

(73) Assignee: Banner Engineering Corp., Minneapolis, MN (US)

( * ) Notice: Subject to any disclaimer, the term of this patent is extended or adjusted under 35 U.S.C. 154(b) by 0 days.

(21) Appl. No.: 17/646,760

(22) Filed: Jan. 3, 2022

(65) Prior Publication Data
US 2022/0155748 A1 May 19, 2022

Related U.S. Application Data

(63) Continuation of application No. 16/508,134, filed on Jul. 10, 2019, now Pat. No. 11,249,452.

(51) Int. Cl.
*G16H 30/40* (2018.01)
*A61C 5/77* (2017.01)
(Continued)

(52) U.S. Cl.
CPC .............. *G05B 19/058* (2013.01); *F16P 3/00* (2013.01); *H04L 67/34* (2013.01);
(Continued)

(58) Field of Classification Search
CPC ................................. F16P 3/00; H04L 67/34
(Continued)

(56) References Cited

U.S. PATENT DOCUMENTS

| 5,444,851 A | 8/1995 | Woest |
| 6,898,542 B2 * | 5/2005 | Ott ........................... G05B 9/02 340/514 |

(Continued)

FOREIGN PATENT DOCUMENTS

WO 2021007480 A1 1/2021

OTHER PUBLICATIONS

Allen-Bradley, Guardmaster® Configurable Safety Relay, original instructions, Dec. 2015, Rockwell Automation Publication, 204 pages, United States.

(Continued)

*Primary Examiner* — Md Azad
(74) *Attorney, Agent, or Firm* — Craige Thompson; Thompson Patent Law; Timothy D. Snowden (57) ABSTRACT

Apparatus and associated methods relate to a safety control system having a processor that (1) automatically interrogates a portable data storage device, (2) determines whether a configuration profile of the safety control system matches a stored configuration profile in the portable data storage device, (3) obtains network settings of the safety control system, and (4) stores network settings into the portable data storage device. In an illustrative example, a safety control system may include a processor designed to perform operations to configure the safety control system with a configuration profile stored in the portable data storage device or download network settings of the safety control system to the portable data storage device under some predetermined conditions. By using the above method, the safety control system may be quickly configured, and network settings may be easily obtained and backed up.

20 Claims, 5 Drawing Sheets

(51) Int. Cl.

| | | |
|---|---|---|
| *G16H 50/50* | (2018.01) | |
| *A61C 13/00* | (2006.01) | |
| *G06F 30/00* | (2020.01) | |
| *A61C 13/34* | (2006.01) | |
| *A61C 9/00* | (2006.01) | |
| *G16H 30/20* | (2018.01) | |
| *G05B 19/05* | (2006.01) | |
| *F16P 3/00* | (2006.01) | |
| *H04L 67/00* | (2022.01) | |

(52) U.S. Cl.
CPC ........... *G05B 2219/1215* (2013.01); *G05B 2219/14006* (2013.01); *G05B 2219/15011* (2013.01)

(58) Field of Classification Search
USPC .......................................................... 700/40
See application file for complete search history.

(56) References Cited

U.S. PATENT DOCUMENTS

| | | | |
|---|---|---|---|
| 9,361,073 | B2 | 6/2016 | Prosak et al. |
| 9,904,265 | B2 | 2/2018 | Schlette et al. |
| 10,133,243 | B2* | 11/2018 | Nixon ..................... H04L 67/18 |
| 2005/0063114 | A1 | 3/2005 | Suhara et al. |
| 2010/0290604 | A1 | 11/2010 | Wright et al. |
| 2014/0020083 | A1 | 1/2014 | Fetik |
| 2016/0252891 | A1* | 9/2016 | Hutt ................... G05B 19/0423 700/83 |
| 2016/0259313 | A1* | 9/2016 | Liu ..................... G05B 23/0216 |
| 2018/0052683 | A1* | 2/2018 | Iguchi ....................... G06F 8/71 |
| 2019/0079507 | A1* | 3/2019 | Jones ................. G05B 23/0216 |

OTHER PUBLICATIONS

Banner, XS/SC26-2 Safety Controller Instruction Manual, instruction manual, Mar. 29, 2018, 133 pages, United States.

Banner, XS/SC26-2 Saftey Controller Quick Start Guide, data sheet, Jan. 5, 2017, 9 pages, United States.

International Preliminary Report on Patentability (IPRP) in related International Application No. PCT/US2020/041511, dated Nov. 3, 2021, including correspondence and publication referred to in IPRP, 115 pages.

Jokab Safety, Sentry safety relays Original instructions, JokabSafety.DK, n.d., [online], [retrieved on Jan. 23, 2019]. Retrieved from the Internet <https://library.e.abb.com/public/1177dad9b773423da99fe43d4875805b/Sentry_Original_Instructions_(EN)_revC_2TLC010002M0201.pdf>.

Mike Garrick, Machine Safety Design: Safety Relays Versus a Single Safety Controller, Techincal and Commercial Considerations, white paper, Phoenix Contact, 7 pages, 2010, Pennsylvania, United States.

* cited by examiner

METHODS TO CONFIGURE A SAFETY CONTROL SYSTEM

CROSS-REFERENCE TO RELATED APPLICATIONS

This application is a Continuation of and claims the benefit of U.S. application Ser. No. 16/508,134, titled "Methods to Configure a Safety Control System," filed by Klesk, et al., on Jul. 10, 2019.

This application incorporates the entire contents of the foregoing application(s) herein by reference."

"The subject matter of this application may have common inventorship with and/or may be related to the subject matter of PCT Application Serial No. PCT/US20/41511, titled "Methods to Configure a Safety Control System, filed by Klesk, et al., on Jul. 10, 2020, which application is a Continuation of and claims the benefit of U.S. application Ser. No. 16/508,134, titled "Methods to Configure a Safety Control System," filed by Klesk, et al., on Jul. 10, 2019.

This application incorporates the entire contents of the foregoing application(s) herein by reference.

TECHNICAL FIELD

Various embodiments relate generally to safety control systems for operating machinery.

BACKGROUND

A typical machine safeguarding system may consist of safety devices (e.g., light curtains, two-hand controls, safety mats, safety laser scanners) connected to a safety evaluation device (e.g., safety relays, safety controllers or safety programmable logic controllers (PLCs)) to protect users from hazards identified on machines. A Safety evaluation device may be used during operation of potentially dangerous machines. A safety evaluation device may receive inputs from safety devices. A safety evaluation device may have self-monitored safety outputs. Safety outputs may be used to remove power from machines in a hazardous area. A safety evaluation device may monitor for faults on both the inputs and outputs. Proper use of safety controllers may increase personnel safety when operating a potentially dangerous machine.

A safety relay is a kind of safety evaluation device in a machine safeguarding system. Some machines may use two safety relays, where one safety relay may be linked to one safety device (e.g., an e-stop circuit), and the other safety relay may be linked to another safety device (e.g., safety light curtain) that stops the hazardous motion, for example. Safety programmable logic controllers (PLCs) and safety controllers are other kinds of safety evaluation devices. Safety controllers having flexibility and configurability may also be used as safety evaluation devices. For example, safety controllers may prevent a decrease in the machine's service life by preventing improper use of the machine.

Some safety controllers may be configurable. For example, a first user may need a safety controller configured only to monitor and generate alerts according to a predetermined set of instructions. A second user may need the safety controller configured to monitor and respond, in accordance with another predetermined set of instructions, if a fault is detected. As such, configurable safety controllers may offer users a wide variety of configurable options that a user may configure according to the user's needs.

SUMMARY

Apparatus and associated methods relate to a safety control system having a processor that (1) automatically interrogates a portable data storage device, (2) determines whether a configuration profile of the safety control system matches a stored configuration profile in the portable data storage device, (3) obtains network settings of the safety control system, and (4) stores network settings into the portable data storage device. In an illustrative example, a safety control system may include a processor designed to perform operations to configure the safety control system with a configuration profile stored in the portable data storage device or download network settings of the safety control system to the portable data storage device under some predetermined conditions. By using the above method, the safety control system may be quickly configured, and network settings may be easily obtained and backed up.

Various embodiments may achieve one or more advantages. For example, a processor of the safety control system may verify whether the configuration profile stored in the data storage device matches the configuration profile saved in the safety control system memory (e.g., non-volatile memory (NVM)), the stored network settings in the data storage device may be updated as the safety control system may be regarded as a master and the data storage device as a slave.

In some embodiments, the safety control system may be highly secure as only authorized configuration profiles may be stored, and only authorized people may return a safety control system to a factory default state. In some embodiments, the safety control system may be a combination of two safety relays and a safety controller to provide a cost-effective replacement for two safety relay modules. The safety control system may be designed to have two independent safe outputs that are capable of high current and a wide range of voltage.

Some embodiments may provide an easy-to-use, configurable, and expandable safety control system designed to monitor multiple safety and non-safety input devices, providing safe stop and start functions for machines with hazardous motion. The safety control system may replace multiple safety relay modules in applications that include safety input devices such as E-stop buttons, interlocking gate switches, safety light curtains, two-hand controls, safety mats, and other safeguarding devices.

The safety control system may also be used in place of larger and more complex safety PLCs with the use of additional input and/or output expansion modules. In some embodiments, the safety control system may have an intuitive programming environment to provide flexible and easy-to-use functions.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, an exemplary design environment used to design a configuration profile in an illustrative scenario is introduced with reference to FIG. 1. Second, with reference to FIG. 2, an exemplary embodiment illustrates a safety control system configured to obtain network settings. Third, with reference to FIG. 3, an exemplary block diagram is described to explain the structure of the safety control system. Finally, with reference to FIGS. 4A-4B, exemplary methods used to configure the safety control system and obtain the network settings are discussed.

Figure 1:
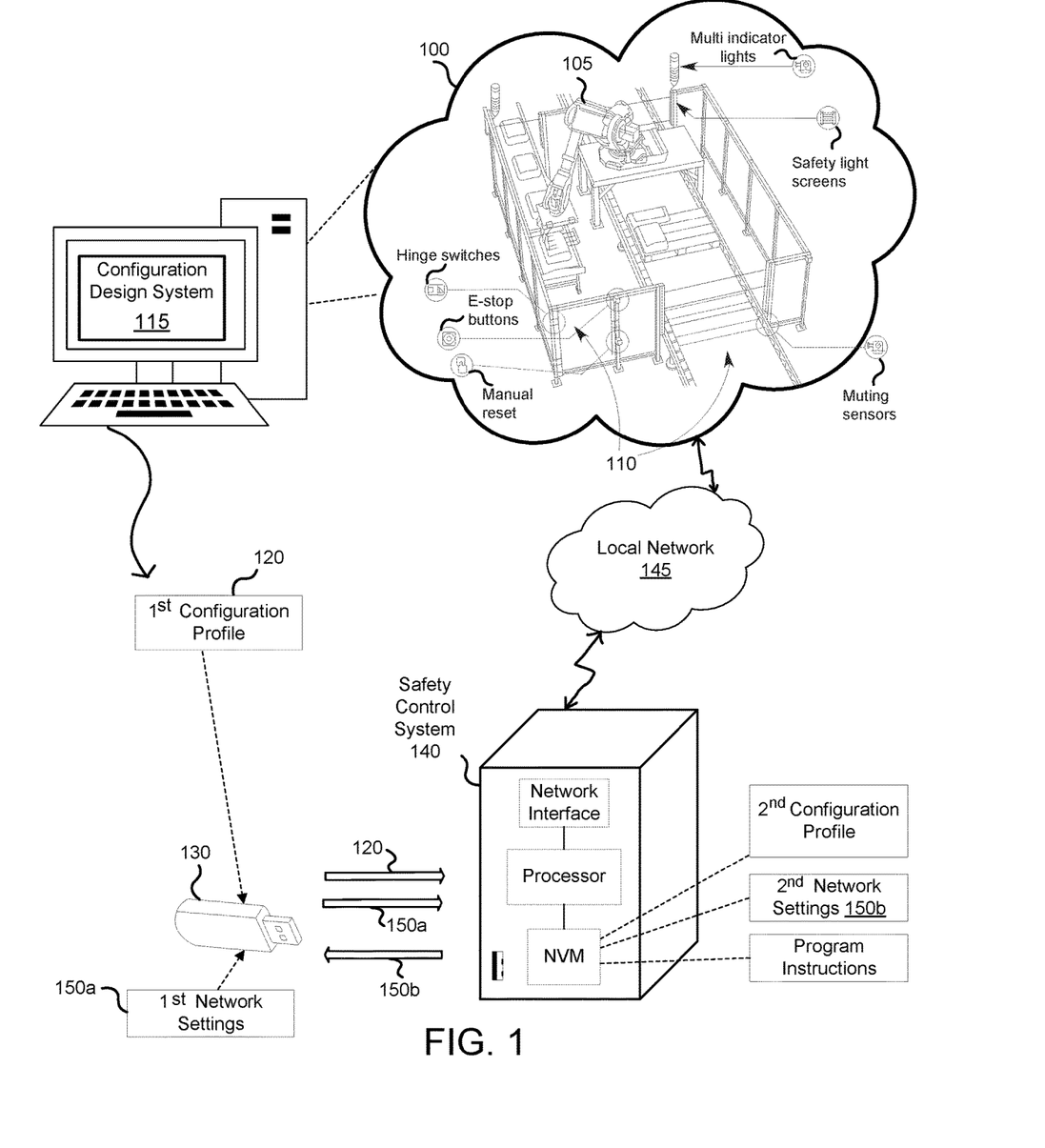
FIG. 1 depicts an exemplary safety control system employed in an illustrative use-case scenario.

FIG. 1 depicts an exemplary safety control system employed in an illustrative use-case scenario. In a depicted scenario 100, a robotic palletizer 105 is safeguarded by safety devices 110 (e.g., safety light curtains, e-stop). There may be several safety functions involved with the robotic palletizer 105 The status of safety devices, in some examples, should be monitored and communicated to operators. Status monitoring may allow operators to ensure that everything is running smoothly and that no safety hazards exist. A safeguarding solution may be needed to control safety light curtains with muting, gate switches and E-stop buttons, for example. The solution may also need to safeguard two conveyors going out, two case infeeds and a forklift entry where empty pallets arrive.

A safety control system 140 may be configured to provide the safeguarding solution and manage all of the safety devices with a single module by executing one or more configuration profiles stored in the safety control system. In some embodiments, the safety control system 140 may have multiple input terminals that can be used to monitor either safety or non-safety devices. The safety or non-safety devices 110 may incorporate either solid-state or contact-based outputs. Some of the input terminals may be configured to, for example, 24V DC for monitoring contacts or to signal the status of an input or an output. The function of each input circuit may depend on the type of the device connected. The function may be established during the configuration.

In this depicted example, safeguarding solution information is sent to a configuration design system 115. Authorized users may use the configuration design system 115 to design configurations (e.g., a first configuration profile 120) to configure the safety control system 140. Designing a first configuration profile 120 may include defining safeguarding application (risk assessment), determining required devices and determining a required level of safety. Safety and non-safety input devices may be added, and circuit connections and other attributes may be chosen. Then, logic blocks and function blocks may be added, and inputs and outputs to function blocks and logic blocks may be connected. The designer may adjust I/O and function blocks' parameters. The first configuration profile 120 may be then created and stored to further configure the safety control system 140.

For example, the first configuration profile 120 may be stored in a removably pluggable data storage device 130 (e.g., a flash drive). In some embodiments, an initial machine builder may also send a first network settings 150a to the data storage device 130. The data storage device 130 may be plugged into the safety control system 140. The safety control system 140 may include a non-volatile memory (NVM) configured to store the first configuration profile 120 and/or the first network settings 150a of the safety control system 140 when the safety control system 140 is at factory default mode, for example. In some embodiments, passwords or other settings may also be stored in the data storage device 130 and then transferred to the data storage device 130 of the safety control system 140. A block diagram of an exemplary safety control system architecture is described in further detail with reference to FIG. 3. The configuration profile stored in the NVM and used by the safety control system 140 may be called a second configuration profile.

In some embodiments, the safety control system 140 may communicate the status of safety devices via an industrial Ethernet feature (e.g., Ethernet/IP) in the same network (e.g., a local network 145). The first network settings 150a (e.g., IP address, protocols, default gateway, network parameters, etc.) of the safety control system 140 may be established when commissioned at the end-user location and may change over time. For example, the first network settings 150a may be changed to a second network settings 150b. In some embodiments, an end user maintenance worker may not know the second network settings 150b of the safety control system 140 and need to configure one or more safety control systems quickly. To improve configuration efficiency and obtain a latest network settings (e.g., the second network settings 150b) of the safety control system 140, the safety control system 140 may be designed to perform (e.g., by a processor) operations (e.g., program instructions stored in a non-volatile memory) to obtain the second network settings. By performing a program of instructions, the network settings 150b of the safety control system 140 may be backed up into the data storage device 130. An exemplary method to configure the safety control system 140 and obtain the second network settings may be discussed in further detail in FIGS. 4A-4B.

In some embodiments, the approved configuration profile 120 may be stored in cloud rather than a flash drive. Secure authorization methods may be used to conduct the communication between the cloud and the safety control system 140.

Figure 2:
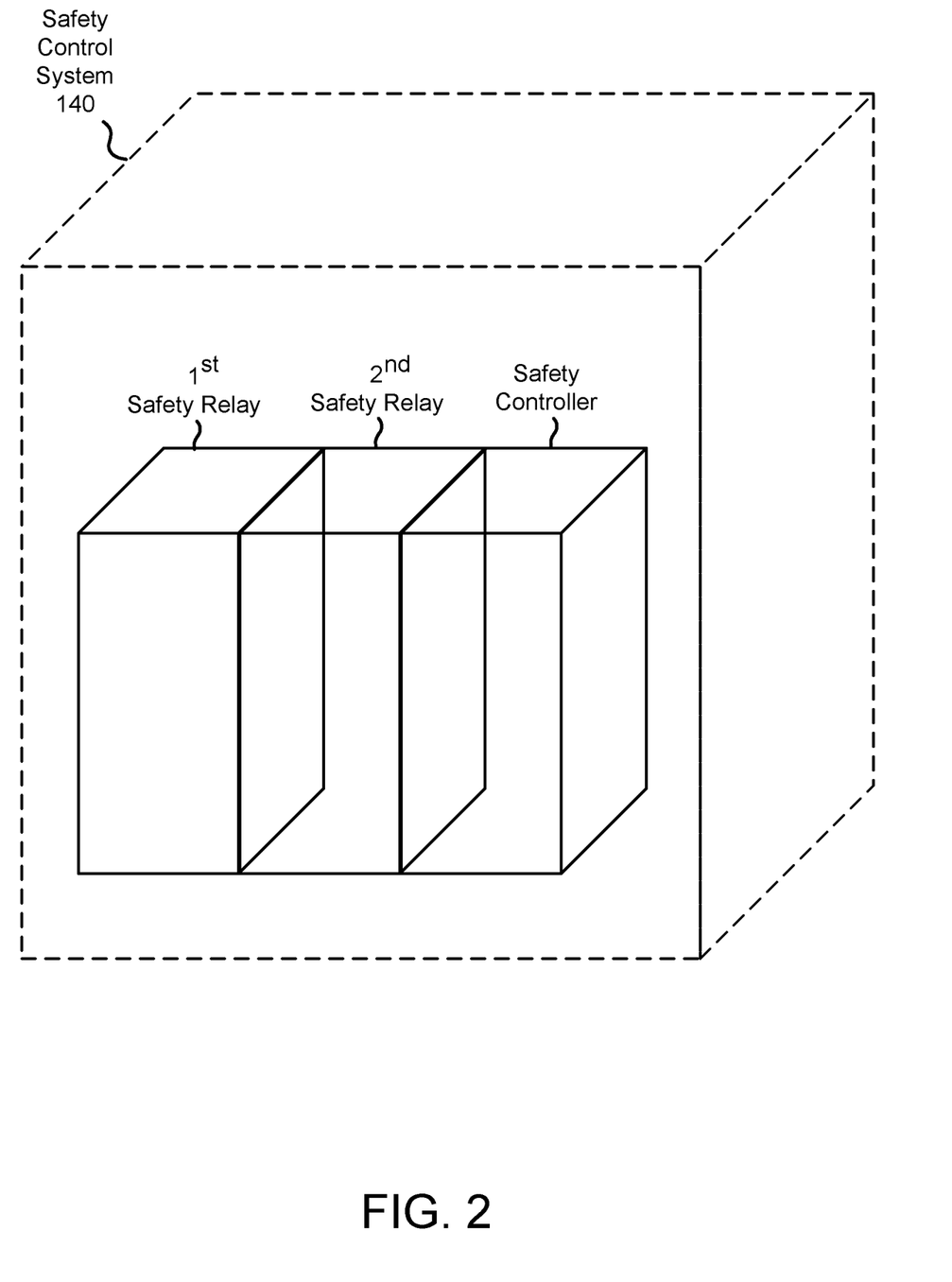
FIG. 2 shows an exemplary safety control system used in FIG. 1.

FIG. 2 shows an exemplary safety control system used in FIG. 1. In some embodiments, the safety control system 140 may include one or more safety relays, and/or one or more safety controllers. In this depicted example, the safety control system 140 includes a first safety relay, a second safety relay, (e.g., electro-magnetic), and a safety controller. The safety control system 140 is a hybrid between a safety controller and safety relay in a self-contained system. Thus, the safety control system 140 may reduce the need for two safety relays or a safety controller plus a relay for simple machines. This integration makes the safety control system 140 a cost-effective replacement for two safety relay modules.

In some embodiments, the safety control system 140 may include ten safety inputs, some of which may be convertible as non-safety outputs. The two independent safe outputs each may use electromagnetic relays that are capable of high current and a wide range of voltage. A PC-based software program, for example, may be used to configure the inputs, logic, and function of the safety control system 140 to provide flexibility needed for most/all machine safeguarding needs. The safety control system 140 may allow a machine builder to stock a single controller that may be configured to meet the needs of a wide range of relays that would otherwise need to be stocked and used. This is also a benefit for end-users for ease of replacement.

In some embodiments, the safety control system 140 may include an Industrial Ethernet port, which allows for communication between the safety control system 140 and a safety programmable logic controller (PLC) for further integration into the machine and advanced troubleshooting. In some embodiments, the first safety relay and the second safety relay may be electro-magnetic safety relays. In some embodiments, the safety control system 140 may have an intuitive programming environment to provide flexible and easy-to-use functions.

Figure 3:
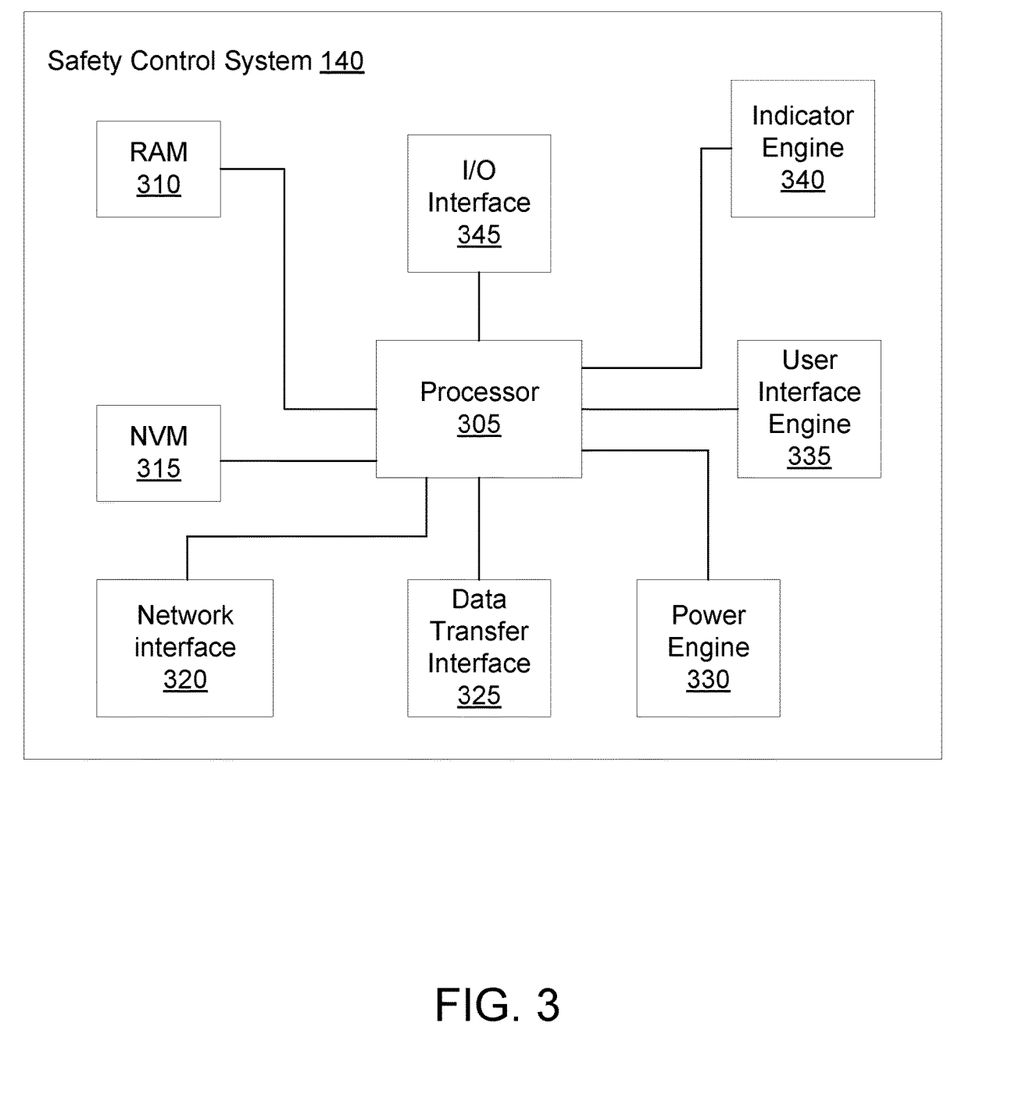
FIG. 3 depicts a block diagram of an exemplary architecture of the safety control system.

FIG. 3 depicts a block diagram of an exemplary architecture of a safety control system. In this depicted example, the safety control system 140 includes a processor 305 configured to perform operations. For example, the processor 305 may determine whether to retrieve data from random-access memory (RAM) 310.

The processor 305 is coupled to a non-volatile memory (NVM) 315. The processor 305 may receive and transmit data signals to the monitored safety device 110, for example. The NVM 315 may be used to store configuration profiles 120 and/or network settings 150*a* of the safety control system 140. The NVM 315 may also include look-up tables (LUTs) to store one or more parameters/operations associated with one or more predetermined criteria. The predetermined criteria may include criteria corresponding to environmental parameters and monitored equipment status parameters.

The NVM 315 may include program instructions to generate actuation commands to output indicators, such as indicator lights and/or audio indicators, for example. For example, the NVM 315 may store instructions that, when executed by the processor 305, cause the processor 305 to perform operations to download the second network settings 150*b* to a portable data storage device (e.g., flash drive). In some embodiments, the operations may include receiving data from the portable data storage device 130 that stores a first configuration profile for the safety control system 140. The operations may also include determining whether the safety control system 140 is in a predetermined state (e.g., factory default state). If the safety control system 140 is not in the predetermined state, then the processor 305 may access the portable data storage device 130 and determine whether the first configuration profile 120 matches a second configuration profile pre-existing in the safety control system 140. If the first configuration profile 120 matches the second configuration profile, then, the processor 305 may transfer a copy of the network settings 150*b* of the safety control system 140 to the portable data storage device 130 via a data transfer link.

The safety control system 140 also includes a network interface 320 operably connected to the processor 305 to provide interconnection between the safety control system 140 and a private or public network. The processor 305 may transmit, via the network interface 320, a generated alert message, for example, to a remote control station. The remote control station may be a computer, for example. The remote control station may function as a processing station to perform analytics, such as executing an FFT algorithm to analyze harmonic content detected by a vibration sensor, for example. The processor 305 also operably connects to a data transfer interface 325. The data transfer interface 325 receives and transmits data from an outside data storage device (e.g., flash drive, cloud).

In this depicted example, the safety control system 140 also includes a power engine 330. The power engine 330 controls the power applied to each safety device.

In this depicted example, the processor 305 operably connects to a user interface engine 335. In some embodiments, the processor 305 may receive operating instructions from a user interface. For example, a user may input data through the user interface to select different settings or different parameters.

The processor 305 is operably connected to an indicator engine 340. For example, the processor 305 may transmit an actuation command to an output indicator, such as a light indicator (LEDs), for example, via the indicator engine 340. The processor 305 may instruct the indicator engine 340 to enable or disable the several LEDs to indicate different status of the safety control system 140. The safety control system 140 also includes I/O interface 345. The I/O interface 345 provides input ports and safety output ports to connect with safety devices, for example. Connections of the input ports and the safety output ports may be monitored. The monitored results may be sent to the processor 305 and the processor 305 may perform predetermined operations stored in the NVM 315.

Figure 4A:
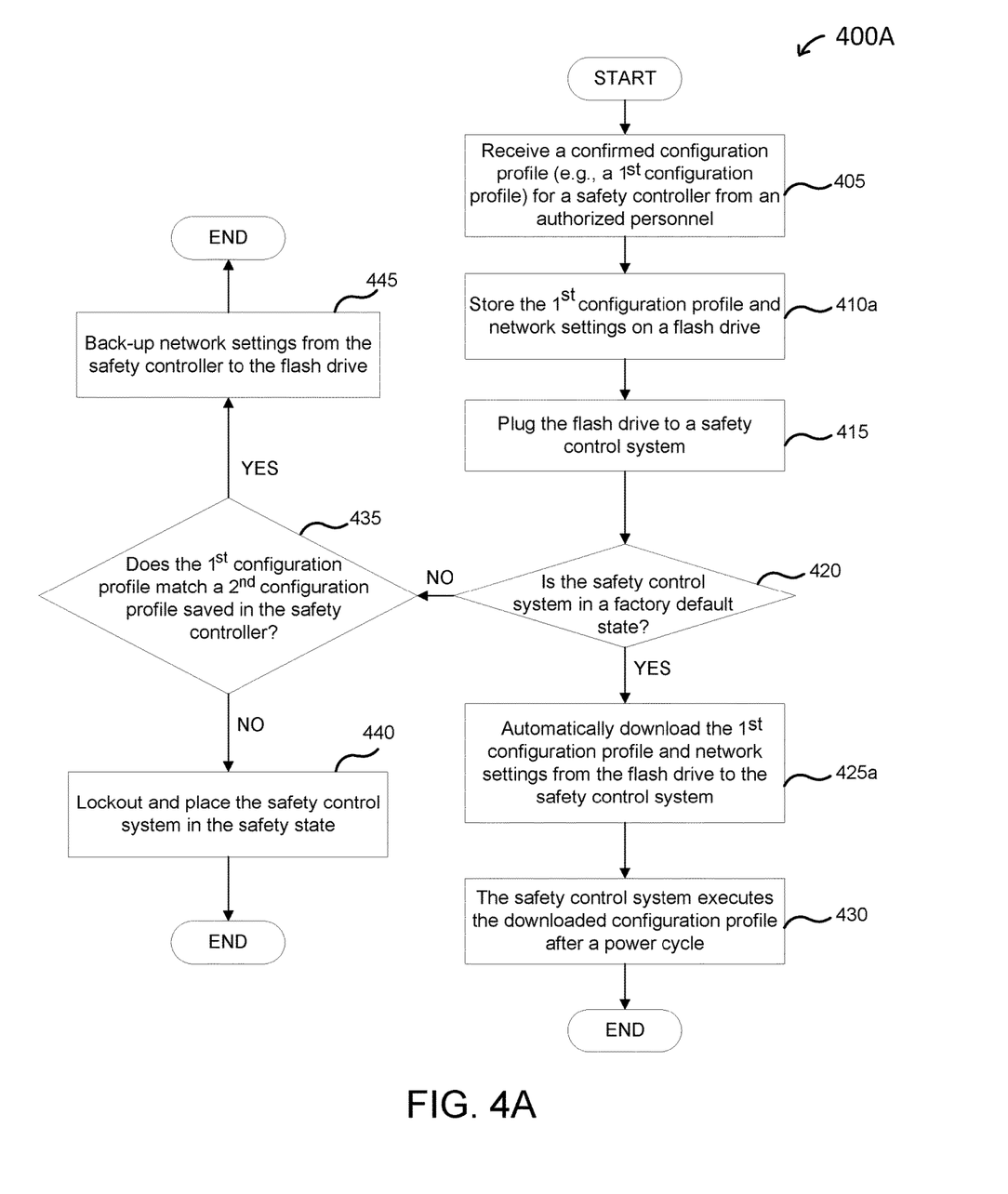
FIG. 4A depicts a flowchart to illustrate an exemplary method to configure the safety control system and obtain network settings of the safety control system.

FIG. 4A depicts a flowchart to illustrate an exemplary method to configure the safety control system and obtain network settings of the safety control system. In this depicted example, a method 400 to configure the safety control system 140 and obtain the network settings 150*b* is introduced. At 405, a confirmed configuration profile (e.g., the first configuration profile) for a safety control system 140 is received. The configuration profile 120 may be designed by an authorized designer and then confirmed and approved by an end-user. At 410*a*, the confirmed configuration profile 120 and network settings 150*a* of the safety control system 140 are stored on a data storage device (e.g., data storage device 130). At 415, the data storage device 130 is plugged into the safety control system 140.

After the data storage device 130 (e.g., flash drive) is plugged into the safety control system 140, at 420, a processor (e.g., the processor 305) in the safety control system 140 determines whether the safety control system 140 is in a predetermined state. The predetermined state may be a factory default state, for example. In some embodiments, to limit and control the download of a configuration profile, the safety control system 140 may be in a factory default state when the safety control system 140 is a new safety control system 140 or when an authorized person restores a safety control system to the factory default. In some embodiments, restoring the safety control system 140 to the factory default may be protected by a password protected feature that only allows authorized personnel to return a safety control system to a factory default.

If the safety control system 140 is in the predetermined state, then, at 425*a*, the processor 305 interrogates the data storage device 130 and downloads the confirmed configuration profile 120 and network settings 150*a* stored in the data storage device 130 to the safety control system 140. In some embodiments, the processor 305 may instruct the indicator engine 340 to generate different displays. For example, when the safety control system 140 is in a factory default state, all LEDs may be green. When the safety control system 140 is not in a factory default state, one of the LEDs may be red. At 430, the processor 305 executes the downloaded configuration profile and the downloaded configuration profile may be fully functional after a power cycle.

If the safety control system 140 is not in the predetermined state, which means the safety control system 140 already includes a pre-existing configuration profile (e.g., the second configuration profile), then, at 435, the processor 305 verifies and determines whether the confirmed configuration profile 120 (e.g., the first configuration profile) in the data storage device 130 matches the pre-existing configuration profile (e.g., the second configuration profile) in the safety control system 140. If the confirmed configuration profile 120 doesn't match the pre-existing configuration profile saved in the safety control system 140, then, at 440, the processor 305 generates a lockout condition, which places the safety control system 140 in safety state (e.g., safety outputs off). The safety control system 140 may resume normal operation when the data storage device 130 is removed, and power is cycled on the safety controller.

If the confirmed configuration profile 120 matches the second configuration profile saved in the safety control system 140, then, at 445, the processor 305 sends copies of the network settings 150b of the safety control system 140 to the data storage device 130. In some embodiments, when the data storage device 130 already stores a latest network setting 150b of the safety control system 140, the safety control system 140 may act as a master device and the data storage device 130 may act as a slave device. The processor 305 may instruct the data storage device 130 to update the first network settings 150a in the data storage device 130 to the latest network settings 150b of the safety control system 140. In some embodiments, other settings may also be copied and sent to the data storage device 130. In some embodiments, the processor 305 may instruct the indicator engine 340 to generate different displays. For example, when the confirmed configuration profile 120 matches the second configuration profile saved in the safety control system 140, all LEDs may be green. When the network settings 150b are backed up, the data storage device 130 may be pulled out and Ethernet features may work after swapping out.

Figure 4B:
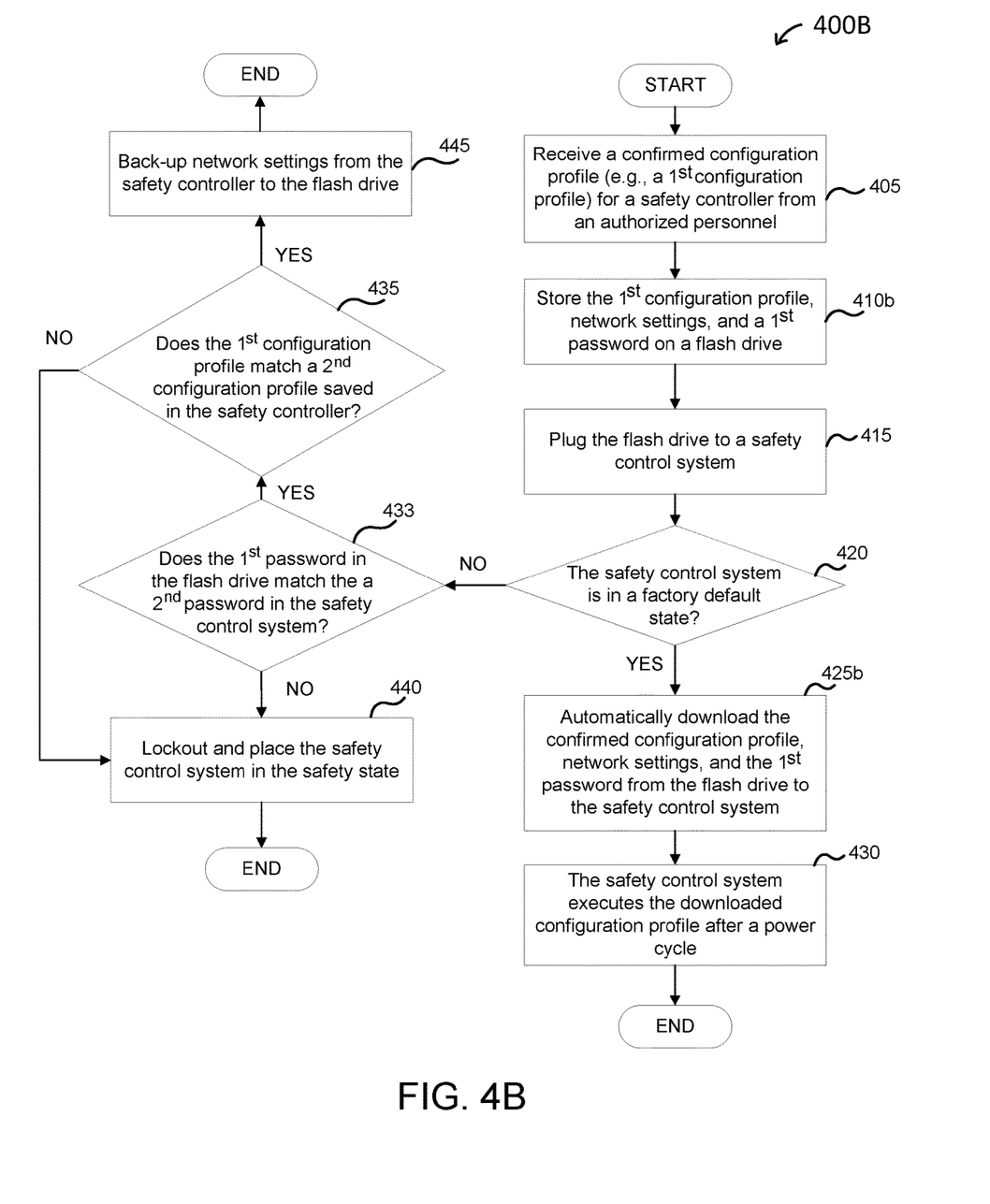
FIG. 4B depicts a flowchart to illustrate another exemplary method to configure the safety control system and obtain network settings of the safety control system.

FIG. 4B depicts a flowchart to illustrate another exemplary method to configure the safety control system and obtain network settings of the safety control system. In this depicted example, passwords may be used in this method 400B to make sure the data storage device 130 (e.g., flash drive) plugged to the safety control system 140 has the authorization to download/backup the network settings 150b. For example, the configured safety control system 140 may only allow a data storage device that has matching passwords and configuration profiles to be left plugged in or stored on the safety control system 140.

At 410b, the confirmed configuration profile 120, network settings 150a, and also a password (e.g., a first password) of the safety control system 140 are stored on a data storage device (e.g., data storage device 130). For example, a first password may be included in a file that is stored on the data storage device 130 and may be passed to a safety control system (e.g., a safety control system 140) along with the confirmed configuration profile 120 and network settings 150a at step 425. At 415, the data storage device 130 is plugged into the safety control system 140.

After the data storage device 130 (e.g., flash drive) is plugged into the safety control system 140, at 420, the processor 305 in the safety control system 140 determines whether the safety control system 140 is in a predetermined state. The predetermined state may be a factory default state, for example.

If the safety control system 140 is in the predetermined state, then, at 425b, the processor 305 interrogates the data storage device 130 and downloads the confirmed configuration profile 120, network settings 150a and the first password in the data storage device 130 to the safety control system 140. At 430, the processor 305 executes the downloaded configuration profile 120 and the downloaded configuration profile 120 may be fully functional after a power cycle.

If the safety control system 140 is not in the predetermined state, which means the safety control system 140 includes a pre-existing configuration profile (e.g., the second configuration profile) and a pre-existing password (e.g., a second password) and network settings 150b, then, at 433, the processor 305 verifies whether the first password stored in the data storage device 130 matches the second password stored in the safety control system 140.

If the first password doesn't match the second password, then, at 440, the processor 305 lockouts the safety control system 140 and places the safety control system 140 in safety state (e.g., safety outputs off). The safety control system 140 may resume normal operation when the data storage device 130 is removed, and after power is cycled on the safety controller.

If the first password matches the second password, then, at 435, the processor 305 verifies and determines whether the confirmed configuration profile 120 (e.g., the first configuration profile) matches the second configuration profile stored in the safety control system 140. If the confirmed configuration profile 120 doesn't match the second configuration profile saved in the safety control system 140, then, the method loops back to 440, the processor 305 generates a lockout condition, which places the safety control system 140 in safety state (e.g., safety outputs off).

If the confirmed configuration profile 120 matches the second configuration profile saved in the safety control system 140, then, at 445, the processor 305 sends copies of network settings 150b of the safety control system 140 to the data storage device 130. In some embodiments, when the data storage device 130 already stores a network setting 150b of the safety control system 140, the safety control system 140 may act as a master device and the data storage device 130 may act as a slave device. The processor 305 may instruct the data storage device 130 to update the network settings 150b stored in the data storage device 130 to the latest network settings 150b of the safety control system 140.

In some embodiments, the method step 433 may happen after step 435. For example, the processor 305 may verify and determine whether the first configuration profile 120 matches the second configuration profile, and then verify whether the first password matches the second password.

Although various embodiments have been described with reference to the figures, other embodiments are possible. For example, some circuit implementations may be controlled in response to signals from analog or digital components, which may be discrete, integrated, or a combination of each. Some embodiments may include programmed and/or programmable devices (e.g., microcontroller, microprocessor), and may include one or more data stores (e.g., cell, register, block, page) that provide single or multi-level digital data storage capability, and which may be volatile and/or non-volatile. Some control functions may be implemented in hardware, software, firmware, or a combination of any of them.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other units suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the data storage device over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using Omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Fire wire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

In one exemplary aspect, a method to handle network settings includes establishing a data transfer link to receive data from a portable data storage device that stores a first configuration profile for a safety control system. The method also includes determining whether the safety control system is in a predetermined state. If the safety control system is not in the predetermined state, then the method also includes (a) accessing the portable data storage device, (b) determining whether the first configuration profile matches a second configuration profile pre-existing in the safety control system. If the first configuration profile matches the second configuration profile, then, the method also includes transferring a copy of the content of a second network settings of the safety control system to the portable data storage device via the data transfer link.

In some embodiments, if the safety control system is in the predetermined state, the method may also include accessing the portable data storage device and transferring a copy of the content of the first configuration profile and a first network settings to the safety control system. The predetermined state may include a predetermined factory default state.

In some embodiments, the method may also include executing the first configuration profile on the safety control system in response to a power cycle. If the first configuration profile doesn't match the second configuration profile, the method may also include configuring the safety control system to enter a lockout state. In some embodiments, upon termination of the data transfer link and cycling power to the safety control system, the method may also include resuming the safety control system in normal operation using the second configuration profile. In some embodiments, the method may also include indicating, via a user interface on the safety control system, whether the safety control system is in the predetermined state. The method may also include indicating, via a user interface on the safety control system, whether the first configuration profile matches the second configuration profile. The safety control system may be a programmable safety control system. In some embodiments, the first and the second configuration profile may include logic control functions that, when executed by a processor on the safety control system, cause the safety control system to perform operations to control safety output signals in response to monitored input signals. In some embodiments, the method may also include if the safety control system is in the predetermined state, then accessing the portable data storage device, and, automatically transferring a copy of the content of the first configuration profile, a first network settings and a first password to the safety control system. In some embodiments, the method may also include determining whether the first password matches a second password profile pre-existing in the safety control system, and, if the first password doesn't match the second password, then configuring the safety control system to enter a lockout state.

In another exemplary aspect, a safety control system includes at least one monitored input port, at least one safety output port, a processor operatively coupled to the at least one monitored input port and the at least one safety output port, a data transfer link interface operatively coupled to the processor, and, a data store coupled to the processor and containing a program of instructions that, when executed by the processor, cause the safety control system to perform operations to download network settings to a portable data storage device. The operations include receiving data from the portable data storage device that stores a first configuration profile for the safety control system, determining whether the safety control system is in a predetermined state. If the safety control system is not in the predetermined state, the operations also include accessing the portable data storage device, determining whether the first configuration profile matches a second configuration profile pre-existing in the safety control system, and transferring a copy of the content of network settings of the safety control system to the portable data storage device via the data transfer link if the first configuration profile matches the second configuration profile.

In some embodiments, the predetermined state may include a predetermined factory default state. In some embodiments, the safety control system may also include a user interface configured to indicate whether the safety control system is in the predetermined state. In some embodiments, the safety control system may also include a user interface configured to indicate whether the first configuration profile matches the second configuration profile.

In some embodiments, the safety control system may be a programmable safety control system.

In some embodiments, the first and the second configuration profile may include logic control functions that, when executed by a processor on the safety control system, cause the safety control system to perform operations to control safety output signals in response to monitored input signals.

In some embodiments, the operations may also include accessing the portable data storage device and transferring a copy of the content of the first configuration profile and a first network settings to the safety control system if the safety control system is in the predetermined state. In some embodiments, the operations may also include executing the first configuration profile on the safety control system in response to a power cycle. In some embodiments, the operations may also include configuring the safety control system to enter a lockout state if the first configuration profile doesn't match the second configuration profile. In some embodiments, the operations may also include upon termination of the data transfer link and cycling power to the safety control system, resuming the safety control system in normal operation using the second configuration profile.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A computer program product (CPP) comprising a program of instructions tangibly embodied on a computer readable medium wherein, when the instructions are executed on a processor, the processor causes operations to be performed to automatically handle network settings, the operations comprising:

establishing, by a first program of executable instructions residing on a data storage device operably connected to at least one processor that automatically executes the first program of executable instructions upon connection of a portable data storage device to a safety control system comprising the at least one processor, a data transfer link to receive data from the portable data storage device that stores a first configuration profile for the safety control system;

determining whether the safety control system is in a predetermined state; and, if the safety control system is not in the predetermined state, then:
(a) accessing, by the at least one processor, the portable data storage device;
(b) determining, by the at least one processor, whether the first configuration profile matches a second configuration profile pre-existing in the safety control system;
(c) if the first configuration profile matches the second configuration profile, then transferring, by the at least one processor, a copy of a content of a second network settings of the safety control system to the portable data storage device via the data transfer link; and,
(d) if the first configuration profile does not match the second configuration profile, then configuring, by the at least one processor, the safety control system to enter a lockout state.

2. The CPP of claim 1, further comprising:
if the safety control system is in the predetermined state, then:
accessing the portable data storage device; and,
automatically transferring a copy of a content of the first configuration profile and a first network settings to the safety control system.

3. The CPP of claim 2, further comprising: executing the first configuration profile on the safety control system in response to a power cycle.

4. The CPP of claim 1, further comprising: upon termination of the data transfer link and cycling power to the safety control system, resuming the safety control system in normal operation using the second configuration profile.

5. The CPP of claim 1, wherein the predetermined state comprises a predetermined factory default state.

6. A safety control system comprising:
at least one monitored input port;
at least one safety output port;
a processor operatively coupled to the at least one monitored input port and the at least one safety output port;
a data transfer link interface operatively coupled to the processor; and,
a data store coupled to the processor and containing a program of instructions that are automatically executed by the processor in response to connection of a portable data storage device to the processor by the data transfer link interface,
wherein the program of instructions, when executed by the processor, cause the processor to perform operations to automatically download network settings to the portable data storage device, the operations comprising:
in response to the connection of the portable data storage device, receiving data from the portable data storage device corresponding to a first configuration profile for the safety control system, the first configuration profile being stored on the portable data storage device;
in response to receiving the data, determining whether the safety control system is in a first predetermined state;
in response to determining that the safety control system is not in the first predetermined state, then:
determining whether the first configuration profile stored on the portable data storage device matches a second configuration profile pre-existing in the safety control system; and,
in response to determining that the first configuration profile matches the second configuration profile, then reconfiguring the portable data storage device as a safety configuration device based on the configuration of the safety control system, the reconfiguration comprising transferring a copy of contents of a second network settings of the safety control system to the portable data storage device via the data transfer link.

7. The safety control system of claim 6, wherein the first predetermined state comprises a predetermined factory default state.

8. The safety control system of claim 6, further comprising a user interface configured to indicate whether the safety control system is in the first predetermined state.

9. The safety control system of claim 6, further comprising a user interface configured to indicate whether the first configuration profile matches the second configuration profile.

10. The safety control system of claim 6, wherein the safety control system comprises a first safety relay, a second safety relay, and a safety controller.

11. The safety control system of claim 6, wherein the first and the second configuration profile comprises logic control functions that, when executed by the processor on the safety control system, cause the safety control system to perform operations to control safety output signals in response to monitored input signals.

12. The safety control system of claim 6, wherein the operations further comprises: if the safety control system is in the predetermined state, then:
accessing the portable data storage device; and,
automatically transferring a copy of contents of the first configuration profile and a first network settings to the safety control system.

13. The safety control system of claim 12, wherein the operations further comprise: executing the first configuration profile on the safety control system in response to a power cycle.

14. The safety control system of claim 6, wherein the operations further comprise: if the first configuration profile does not match the second configuration profile, then configuring, by the processor, the safety control system to enter a lockout state.

15. The safety control system of claim 6, wherein the operations further comprises: upon termination of the data transfer link and cycling power to the safety control system, resuming the safety control system in normal operation using the second configuration profile.

16. A safety control system comprises:
at least one monitored input port;
at least one safety output port;
at least one processor operatively coupled to the at least one monitored input port and the at least one safety output port;
a data transfer link interface operatively coupled to the at least one processor; and,
a data store coupled to the at least one processor and containing a program of instructions that, when executed by the at least one processor, cause the at least one processor to perform operations to automatically download network settings to a portable data storage device in response to connection of the portable data storage device to the at least one processor by the data transfer link interface, the operations comprising:
receiving data from the portable data storage device that stores a first configuration profile for the safety control system;
determining whether the safety control system is in a predetermined state; and, if the safety control system is not in the predetermined state, then:
(a) accessing, by the at least one processor, the portable data storage device;
(b) determining, by the at least one processor, whether the first configuration profile matches a second configuration profile pre-existing in the safety control system; and,
(c) if the first configuration profile matches the second configuration profile, then reconfiguring the portable data storage device as a safety configuration device based on the configuration of the safety control system, the reconfiguration comprising transferring, by the at least one processor, a copy of contents of a second network settings of the safety control system to the portable data storage device via the data transfer link.

17. The system of claim 16, the operations further comprising:
- if the first configuration profile does not match the second configuration profile, then configuring, by the at least one processor, the safety control system to enter a lockout state.

18. The system of claim 16, further comprising:
- if the safety control system is in the predetermined state, then:
  - accessing the portable data storage device; and,
  - automatically transferring the copy of contents of the first configuration profile and a first network settings to the safety control system.

19. The system of claim 16, further comprising: upon termination of the data transfer link and cycling power to the safety control system, resuming the safety control system in normal operation using the second configuration profile.

20. The system of claim 16, wherein the predetermined state comprises a predetermined factory default state.

* * * * *